R. E. CARSWELL.
COMBINED VENTILATOR AND ADVERTISING DEVICE.
APPLICATION FILED NOV. 18, 1912.
1,072,821.
Patented Sept. 9, 1913.
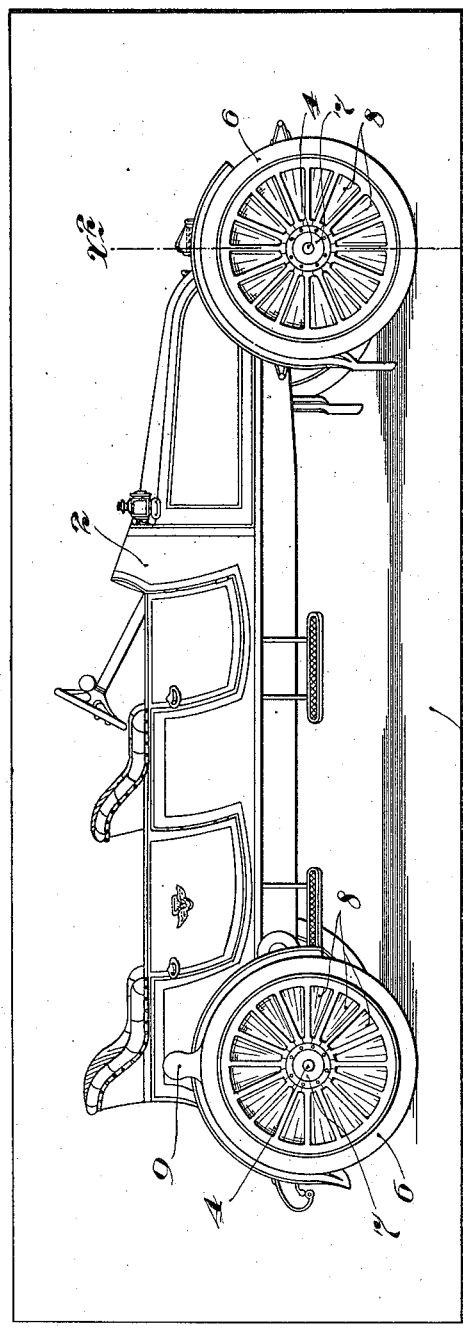
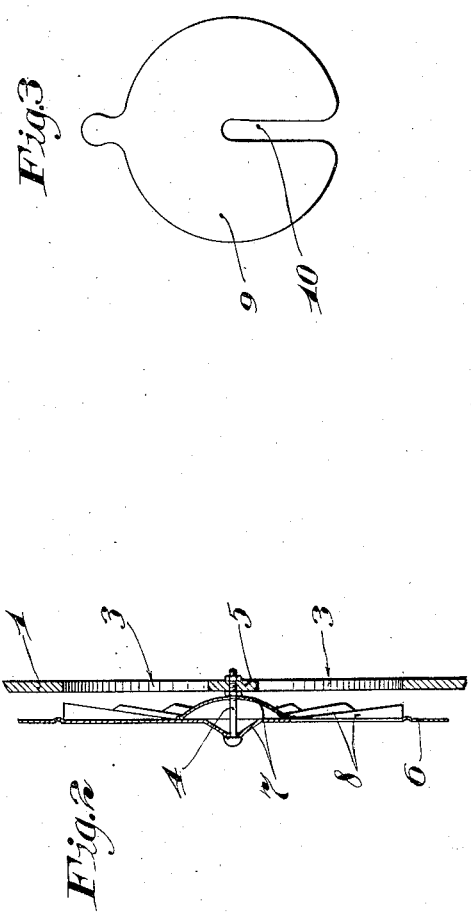

UNITED STATES PATENT OFFICE.

ROBERT E. CARSWELL, OF MINNEAPOLIS, MINNESOTA.

COMBINED VENTILATOR AND ADVERTISING DEVICE.

1,072,821.  Specification of Letters Patent.  Patented Sept. 9, 1913.

Application filed November 18, 1912. Serial No. 732,092.

*To all whom it may concern:*

Be it known that I, ROBERT E. CARSWELL, a citizen of the United States, residing at Minneapolis, in the county of Hennepin and State of Minnesota, have invented certain new and useful Improvements in Combined Ventilators and Advertising Devices; and I do hereby declare the following to be a full, clear, and exact description of the invention, such as will enable others skilled in the art to which it appertains to make and use the same.

My present invention has for its object to provide a combined advertising device and window ventilator of simple construction and attractive appearance; and to such ends, generally stated, the invention consists of the novel devices and combinations of devices hereinafter described and defined in the claims.

In the preferred embodiment of the invention, the body outlines of an automobile are printed, stamped or otherwise marked on the face of a rectangular board which is adapted to be inserted in a partly opened window. The wheels of this dummy automobile are revoluble and the spoke zones thereof are formed with oblique propeller blades which cause the wheels to rotate when subjected to even a light draft. The board on which the automobile is marked or to which the representation thereof is applied, is provided in line with the wheels with air passages, so that when the device is placed in the window, air will pass either from the exterior into the room or from the room outward, and thereby afford good ventilation while causing the wheels of the machine to run, thereby giving the appearance of a moving automobile.

The invention is illustrated in the accompanying drawings wherein like characters indicate like parts throughout the several views.

Referring to the drawings, Figure 1 is an elevation looking at the face of the board and the dummy automobile which is applied thereto; Fig. 2 is a detail in section on the line $x^2$ $x^2$ on Fig. 1; and Fig. 3 is a detail in elevation showing one of the closures or gates for coöperation with the air passages in the ventilating board.

The so-called ventilating board is indicated by the numeral 1 and may be made of cardboard, wood, metal or any other suitable material, and should be of such size that it will fit under the sash of an open or partly opened window.

The numeral 2 indicates the dummy automobile which, as indicated, may be printed, stamped, or otherwise applied on the board 1.

The numeral 3 indicates the air passages formed in the board 1 in line with the wheels.

The numeral 4 indicates the wheel spindles which, as shown, are rigidly secured to supporting bars 5 formed as a part of the board 1, and extended diametrically across the air passages 3. On the spindles 4, the wheels 6 are preferably stamped from thin sheet metal and provided with hub portions 7 and with spokes represented by portions of oblique propeller blades 8.

The numeral 9 indicates the closures or gates which are adapted to close the air passages 3 of the board 1, and which, as shown, are provided with radial notches 10 adapting them to straddle the spindles 4, just between the board 1 and the hubs of the wheels 6. When these gates 9 are applied, as shown at the left in Fig. 1, they will close the passages 3 so that there will be no passage of air through the same, and hence, the wheel or wheels will not rotate. When the gates 9 are removed, there will, as already indicated, be a draft through the passages 3 which, acting against the propeller blades 8 of the wheels, will cause the latter to rotate. This device, therefore, serves as an efficient ventilator and at the same time, because of its very attractive and novel appearance, given by the rotation of the wheels, it is especially well adapted for an advertising device. More particularly, it is adapted for an advertising device for various makes of automobiles, but it may be used as an advertising device for various other wheeled vehicles.

I also contemplate making this device in small sizes for use for advertising purposes or as a novelty to be used anywhere where draft will rotate the wheels. In fact, the wheels may be rotated simply by blowing against the same.

What I claim is:

1. A device of the kind described, comprising a board having thereon a representation of a wheeled vehicle and provided with air passages alined with the wheels thereof, and the wheels of the said vehicle being rotatable, and having in their spoke zones propelling blades adapting the wheels to be rotated by a draft of air moving through the air passages of said board.

2. A device of the kind described, comprising a board having thereon a representation of a wheeled vehicle and provided with air passages alined with the wheels thereof, the wheels of the said vehicle being rotatable and having in their spoke zones propelling blades adapting the wheels to be rotated by a draft of air moving through the air passages of said board, and gates movable to open and close the said air passages.

3. A device of the kind described comprising a board having thereon a representation of an automobile and having air passages alined with the wheels thereof and having fixed spindles at the axes of the wheels, the wheels of the dummy automobile being stamped from sheet metal and formed with propelling blades in their spoke zones and being rotatably mounted on the said spindles.

4. A device of the kind described comprising a board having thereon a representation of an automobile and having air passages alined with the wheels thereof and having fixed spindles at the axes of the wheels, the wheels of the dummy automobile being stamped from sheet metal and formed with propelling blades in their spoke zones and being rotatably mounted on the said spindles, and gates provided with notches adapting them to straddle the said wheel spindles, and the said gates being movable to open and close the air passages of said board.

In testimony whereof I affix my signature in presence of two witnesses.

ROBERT E. CARSWELL.

Witnesses:
HARRY D. KILGORE,
F. D. MERCHANT.

---

Copies of this patent may be obtained for five cents each, by addressing the "Commissioner of Patents, Washington, D. C."